United States Patent [19]
Sano et al.

[11] Patent Number: 5,577,681
[45] Date of Patent: Nov. 26, 1996

[54] BELT-DRIVEN DATA CARTRIDGE WITH PACK BELT

[75] Inventors: Koichi Sano, Sagamihara, Japan; David P. Smith, Hudson, Wis.; David D. Madsen, Lakeland, Minn.

[73] Assignee: Imation Corp., St. Paul, Minn.

[21] Appl. No.: 496,365

[22] Filed: Jun. 29, 1995

[30] Foreign Application Priority Data

Jul. 4, 1994 [JP] Japan .................................. 6-151980

[51] Int. Cl.⁶ .................................................. G11B 23/087
[52] U.S. Cl. ...................... 242/342; 242/343.2; 360/132
[58] Field of Search ................................... 242/340, 341, 242/342, 352.4, 343.2; 360/132

[56] References Cited

U.S. PATENT DOCUMENTS

| | | | |
|---|---|---|---|
| 3,692,255 | 9/1972 | von Behren | 242/342 |
| 4,172,569 | 10/1979 | Newell | 242/342 |
| 4,242,709 | 12/1980 | Stricker | 242/342 |
| 4,447,019 | 5/1984 | Nagorski | 242/342 |
| 4,455,001 | 6/1984 | Schilke et al. | 242/342 |
| 4,474,342 | 10/1984 | Nater | 242/342 |
| 4,502,648 | 3/1985 | Newell | 242/342 |
| 4,678,137 | 7/1987 | Kincheloe | 242/352.4 |
| 4,688,742 | 8/1987 | Hettich | 242/342 |
| 5,097,374 | 3/1992 | Koizumi et al. | 242/342 |
| 5,358,193 | 10/1994 | Madsen et al. | 242/342 |
| 5,374,004 | 12/1994 | von Behren | 242/352.4 |

FOREIGN PATENT DOCUMENTS

| | | |
|---|---|---|
| 0579116 | 1/1994 | European Pat. Off. . |
| 4204134 | 2/1992 | Germany . |
| 48-15517 | of 1973 | Japan . |
| 63-191350 | 8/1988 | Japan . |
| 2081958 | 2/1982 | United Kingdom . |
| 93/24928 | 12/1993 | WIPO . |

OTHER PUBLICATIONS von Behren & Smith, "Mechanical Design of a Belt–Driven Data Cartridge", *Adv. Info. Storage Sys.*, vol. 1, p. 49 (1991).
Cruden, "N2 Principal Conquers Inherent Design Flaws of 1/4–In. Tape Cartridge", *Computer Technology Review*, p. 109 (Summer 1985).
Childs et al., "Power transmission by flat, V and timing belts", *Tribological Design of Machine Elements*, Proceedings of the 15th Leeds–Lyon Symposium on Tribology held at Bodington Hall, The University of Leeds, UK, Tribology Series 14, Paper No. V(i).

*Primary Examiner*—John Q. Nguyen
*Attorney, Agent, or Firm*—Charles L. Dennis, II

[57] ABSTRACT

A pack belt or similar mechanism is provided in a two hub, belt-driven data cartridge to press against the tape pack on the take-up hub side of the cartridge when approximately half of the tape has wound onto that hub. The added load from this pressure reduces the speed of the tape-up hub, which in turn reduces the speed differential between the two hubs. Since the speed differential between the hubs causes a gradient in tape tension (bow-tie) as the tape is moved from BOT to EOT, this reduces or eliminates the bow-tie. Adjustment of the relative tensions between the drive belt and the pack belt allows adjustment of the bow-tie, ranging from the normal bow-tie, to near zero bow-tie, to a negative bow-tie. Coating one side each of the drive belt and the pack belt, then having the coated side of the drive belt contact the uncoated side of the pack belt further reduces bow-tie. Combining the pack belt with self-acting hydrodynamically lubricated guides significantly improves the efficiency of the cartridge/drive system at low tape travel speeds.

25 Claims, 7 Drawing Sheets

BELT-DRIVEN DATA CARTRIDGE WITH PACK BELT

BACKGROUND OF THE INVENTION

1. Field of the Invention

The present invention relates to tape cartridges having two hubs with tape wound around each of the hubs and extending from one hub to the next, and more particularly to a belt-driven tape cartridge.

2. Description of the Related Art

The belt-driven tape cartridge, or data cartridge, has been known for many years, e.g., as shown in U.S. Pat. No. 3,692,255 (von Behren) and Japanese Laid-Open Patent Publication No. 48-15517. As shown in FIGS. 1–3 of the von Behren reference, the typical data cartridge includes a housing enclosing a pair of rotatably mounted tape hubs about which tape is wound. In the course of passing from one hub to the other, the tape passes along a predefined tape path in the data cartridge, which takes it past a cut-away portion through which the head of a drive can access the tape. The data cartridge housing also encloses a pair of corner rollers, and a drive roller. An elastic belt is stretched around the rollers and the tape packs on the hubs. The drive roller is accessible by a drive puck of a tape drive through an opening formed at the front of the housing. Movement of the drive roller by the puck causes the belt to move, and frictional engagement between the belt and the tape then causes the tape to move. In addition to moving the tape, the belt provides proper tension in the tape. The tape can be moved and read in either direction, i.e., either hub can serve as the supply hub and either as the take-up hub. The terms "supply hub" and "take-up hub" will be used in describing the operation of the invention herein, but it is to be understood that either hub could play the role of a supply hub or a take-up hub, depending on the direction of movement of the tape at any given moment.

Proper tension must be maintained in the tape for it to maintain proper contact with the head. As explained in the von Behren reference, this tape tension is created due to the combined effects of differences in speed between the tape hubs, the relative elasticity of the belt and inelasticity of the tape, and friction in various components in the data cartridge. Thus, a number of elements in the cartridge can be modified to adjust the tape tension.

In Advanced Information Storage Systems, vol. 1,49, 1991, Robert A. von Behren and David P. Smith put forth a formula which approximated the various effects on tape tension. The article indicates the tension of the tape on a reading/writing magnetic head is expressed by the following equation:

$$Th=\{(T3-T2)+Ts+Mb \cdot tb(1/D1-1/D2)\} \cdot (\text{Multiplier Term})$$

where
$Th$=the tensile force of tape on the reading/writing magnetic head
$T3-T2$=the rotational frictional forces of the corner rollers
$Ts$=the rotational frictional force of the supply hub
$Mb$=the elastic modulus of the drive belt
$tb$=the thickness of drive belt
$D1$=the outer diameter of the tape pack on the supply hub
$D2$=the outer diameter of the tape pack on the take-up hub
Multiplier Term=a term relating to the frictional force between the tape and tape guide.

As tape is wound from the supply hub to the take-up hub, the diameters D1 and D2 gradually change. As shown by the third term of the above equation, this means that the tape tension also changes. In particular, this creates a gradient in the tape tension as the tape is wound from one end of the tape to the other. More specifically, the tape is moved by the drive belt, which in turn is driven by an external motor via the drive roller. As the tape winds onto the take-up hub, the drive belt must stretch to accommodate the extra diameter. At the same time, the supply hub shrinks, allowing the drive belt to contract around it. The result is that the speed of the supply hub varies compared to that of the take-up hub. Since the tape is relatively inelastic compared to the belt, the difference between the speeds of the hubs is converted into tensile force in the tape and, consequently, the difference between the driven speeds of both tape packs increases as the difference in the pack diameter of the tape wound into tape packs around both hubs increases, thus generating a gradient in the tensile force of the tape.

In practice, the difference between the minimum and maximum tensile force on the tape typically is approximately 0.49 N. This difference causes several problems: (1) The contact pressure between the magnetic head and the tape varies with the tape tension, so that stable contact pressure cannot be maintained. (2) Variations in contact pressure in turn means that the tape may alternately stick and slip, i.e., stable traveling speeds may be difficult to achieve. (3) The edge of the tape must withstand a greater range of tension, which makes it more difficult to obtain high durability in the tape. (4) It is difficult to reduce errors in recording or reproducing information due to all of the foregoing variations. (5) The motor in the drive must be capable of driving the tape accurately at both the highest and the lowest drive force levels. The broader the range, the greater the difficulty this poses.

Designing a suitable system to use a data cartridge is complex. As will be apparent from the foregoing, it is necessary to be sure the maximum force needed to move and tension the tape is smaller than the maximum drive force which a drive can provide. It is important that the drive provide enough force to the cartridge to maintain the minimum tape tension necessary for the magnetic head to make good contact with the tape. It is also necessary to control frictional forces between various parts in the data cartridge. For example, it is necessary to minimize the frictional forces in the contact portions between the tape and tape guides, between the drive roller and its shaft, and between the tape hubs and their shafts. On the other hand, it is necessary for the corner rollers to maintain a certain level of friction to generate an appropriate drag force. Thus, it is not desirable to reduce the frictional force in the corner rollers as far as possible.

Japanese Laid-Open Patent Publications Nos. 63-191350 and 2-158977 propose certain techniques for adjusting the tensile force of the tape in a data cartridge. These include adjusting the outer diameters of the corner rollers, and setting the viscosity of grease applied between the corner rollers and their pivot pins appropriately.

U.S. Pat. No. 4,172,569 (Newell) teaches yet another technique. Newell's data cartridge includes, in addition to the drive belt of the conventional data cartridge, an endless belt called a tensioning belt. The tensioning belt is engaged on the drive roller and the corner rollers, but at a different height from the drive belt. Thus, the tensioning belt does not press directly or indirectly against the tape wound on the tape hubs.

The Newell data cartridge has several problems: (1) Since the drive belt and the tensioning belt are both engaged on the drive roller, a large load is applied directly to the drive roller. This increases the drive force required to move the tape, in turn causing the motor driving the cartridge to consume more power. (2) Since the two belts are engaged on the drive roller and the corner rollers at different levels, there is a possibility that the axes of the rollers will become eccentric. This would prevent the tape from traveling reliably, with the result that noise would be generated during travel of the tape. In extreme cases, the belt or tape might come off its guides. (3) Due to the increased space required for the tensioning belt, the Newell data cartridge is thicker than a standard data cartridge. This limits the ability to increase the recording capacity per unit volume.

European Patent Application No. 0 579 116 (Schoeppel et al.) teaches another technique, which is to adjust the k factor (stretchability) of the belt. Unfortunately, the extent to which one can adjust the k factor is somewhat limited by the materials used, typically polyurethane. Thus, while this may allow some reduction in the bow tie, it cannot eliminate it.

Finally, while some friction in the belt is essential, friction between the tape and the tape guides normally is not essential to operation of the data cartridge. For example, U.S. Pat. No. 5,358,193 (Madsen et al.) teaches the use of self-acting hydrodynamically lubricated guides, in which a layer of air minimizes friction between the corner tape guides and the tape.

SUMMARY OF THE INVENTION

The present invention solves these and other problems by adding a restraining mechanism to engage the outer surface of the tape pack on the take-up hub, with more force being applied as more tape accumulates on the take-up hub. Pressure from the restraining mechanism applies a load to the take-up hub, which restrains rotation of that hub. This in turn reduces the difference between the rotational speeds of the supply and take-up hubs. That is, the restraining mechanism functions to reduce the fluctuation of the tension of the tape which occurs due to change in thickness of the tape pack wound around the tape hubs as the tape travels from its beginning to its end, and vice versa.

Preferably, the restraining mechanism starts to press the tape pack on the take-up hub after approximately half of the tape wound around the supply hub has shifted to the take-up hub.

Preferably, the restraining mechanism comprises a pack belt engaged between the first and second corner rollers, inside the drive belt. That is, the pack belt is positioned onto the corner rollers and the drive belt is positioned around the pack belt in a co-planar fashion.

It has been discovered that by judicious control of the tension in both the drive belt and the pack belt, the tape tension characteristics can be controlled in a very surprising manner. In particular, the tape tension can be controlled to produce anywhere from the usual bow tie to a virtually flat tension range to even a "negative" bow tie, all by controlling the ratios of the tension between the pack belt and the drive belt.

Alternatively, instead of using a pack belt extending between the two usually pre-existing corner rollers, spring mounted pressing rollers can be used, or pairs of pack belts can be provided, on either side of the tape packs.

It has been found that the tension variability can be controlled even further by using appropriate coatings on the pack belt and the drive belt. Using such coatings can dramatically reduce the variation in drive force and tape tension. Use of various different greases also can aid in controlling the total tape tension.

Finally, combining the pack belt with a self-acting hydrodynamically lubricated guide can significantly lower total drive force required to move and tension the tape.

As will be apparent, a dramatic reduction in the drive force required to operate a cartridge, while simultaneously providing proper movement control and tape tension for the tape, has significant advantages. Most notably, the power requirements for the drive operating the cartridge can be substantially reduced. In addition, heat dissipation in the cartridge will be substantially reduced, which reduces problems due to degradation of the materials due to heat. This has the potential to significantly extend the lifetime of the cartridge. In addition, in contrast to the Newell cartridge, the positioning of the present pack belt allows the existing envelope of the data cartridge to remain unchanged. That is, it need not be thickened.

A further use of the tension control characteristics of the pack belt is to allow smaller hubs. The current diameter of a hub in the tape pack is relatively large, because a narrow hub would only exacerbate the bow tie. However, the significantly improved tape tension control provided by a pack belt would allow substantial reductions in the diameter of the tape hub. This in turn would allow a substantial increase in the amount of tape which could be held in a given cartridge, dramatically increasing the capacity of the cartridge. More accurate control also allows for increased data density on the tape. Higher data density means a cartridge can hold more data or hold the same data with less tape.

DETAILED DESCRIPTION OF THE PREFERRED EMBODIMENTS

Figure 1:
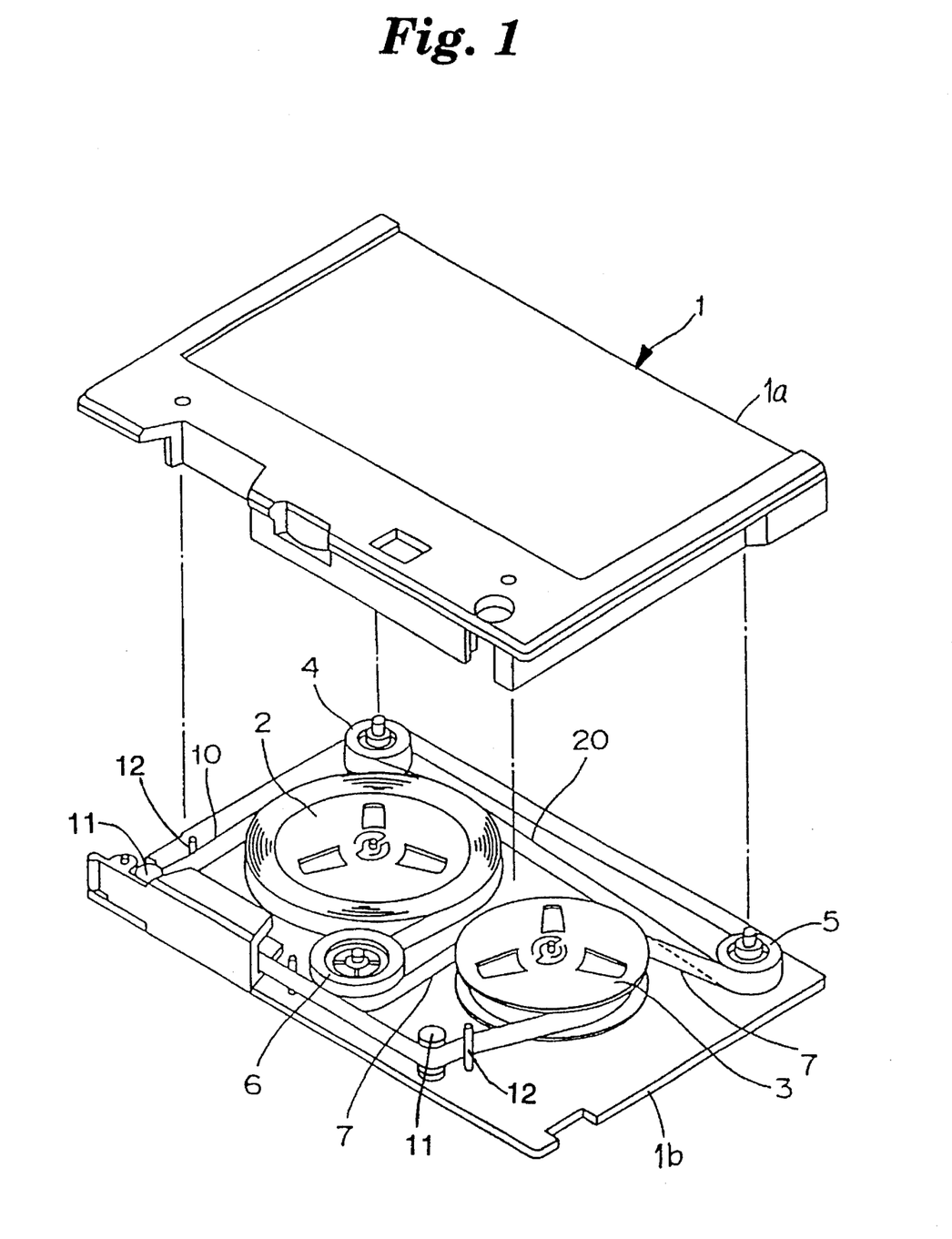
FIG. 1 is a partially exploded perspective view showing construction of a belt-driven tape cartridge according to a first embodiment of the present invention.
Figures 2, 5:
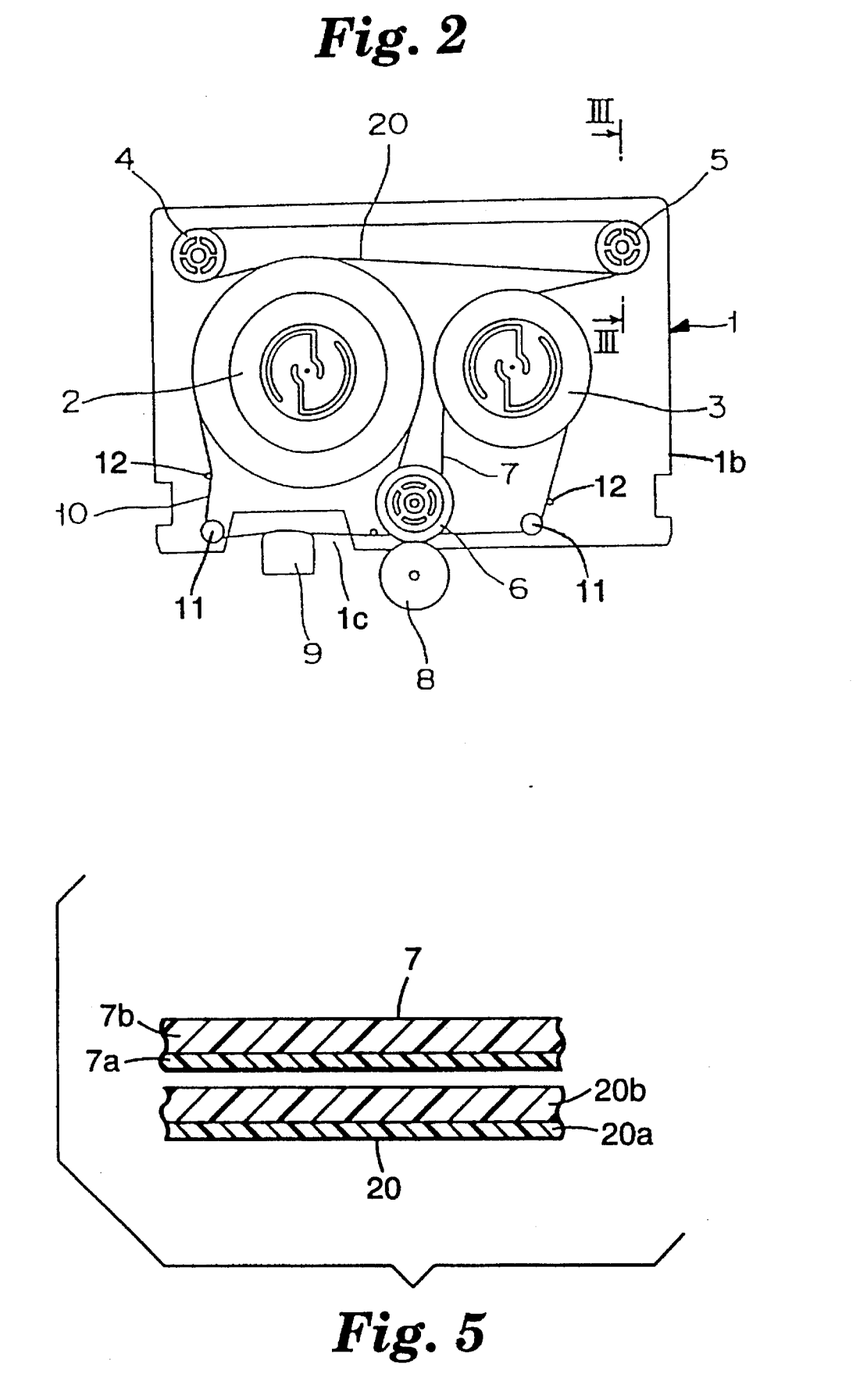
FIG. 2 is a plan view of the tape cartridge of FIG. 1, with the cover removed.
FIG. 5 is a schematic view of the preferred coating alignment on the belts in the first embodiment.
Figure 3:
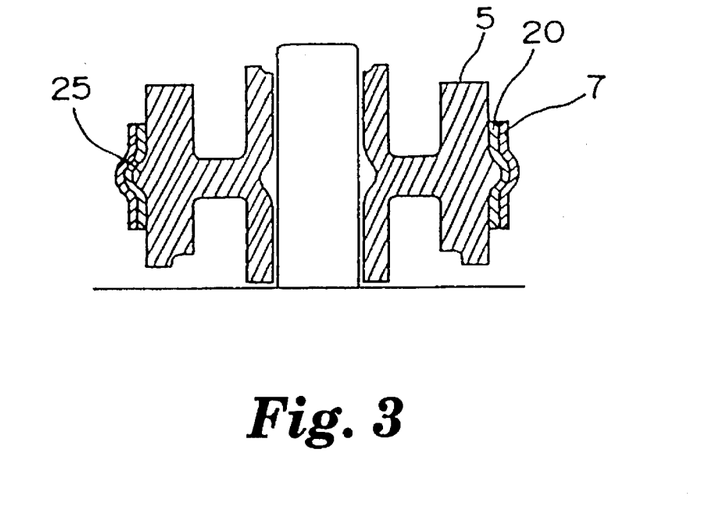
FIG. 3 is a sectional view taken along III—III in FIG. 2.

FIGS. 1 and 2 depict a first embodiment of a data cartridge according to the present invention. In this data cartridge, a housing, generally 1, is formed of a shell 1a and baseplate 1b. It contains tape hubs 2, 3, corner rollers 4, 5 and a drive roller 6 rotatably mounted therein. Tape 10 is wrapped around the hubs 2, 3 and is fed via a predetermined tape path past a media access opening 1c (best seen in FIG. 2). This tape path is usually established in part by tape guides 11, and in some cartridges, wrap pins 12 (wrap pins generally are used in larger cartridges, but not smaller ones). An elastic pack belt 20 is stretched around the two corner rollers 4, 5. A drive belt 7 is mounted around the drive roller 6, the tape packs formed on the hubs 2, 3 and around the corner rollers 4, 5. As best seen in FIG. 3, the drive belt 7 lays over the pack belt 20. The corner rollers 4, 5 also preferably include a crown 25 to help center the drive and pack belts 7, 20. As best seen in FIG. 2, when a sufficient amount of tape 10 is wound around one of the hubs 2, 3, the tape pack engages the pack belt 20. This provides additional load on that tape pack to reduce the difference in speeds between the hubs 2, 3.

Figure 10:
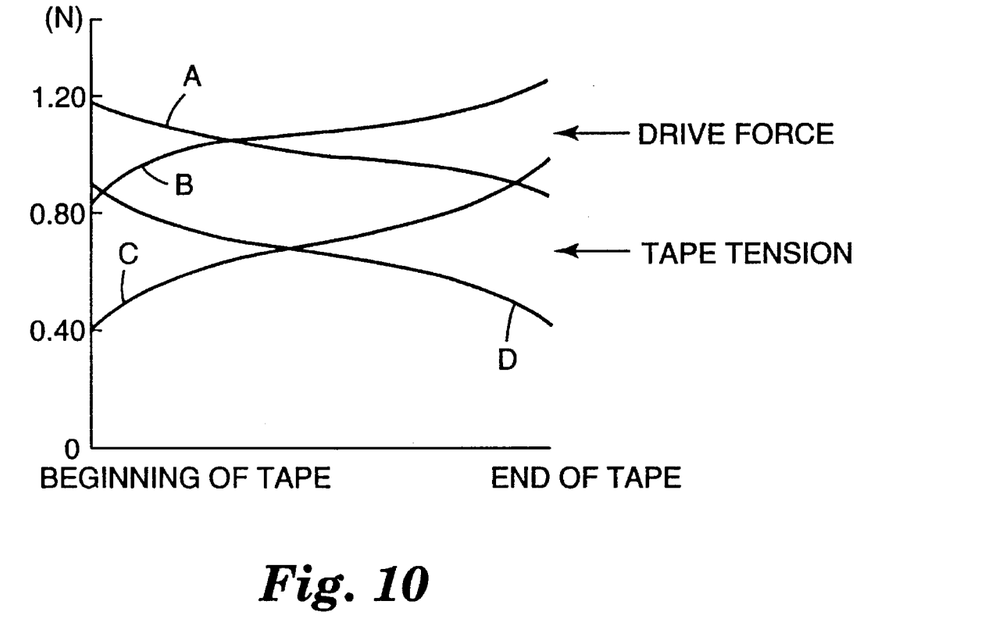
FIG. 10 is a graph showing the changes in drive force and tape tension during tape travel of a conventional tape cartridge.

Graphs showing measurements of the tape tension and drive force are easily created by using a drive with a pressure sensor substituted for the magnetic head and drive force sensor attached to the drive. FIG. 10 shows a typical graph for the tape tension and drive force in a conventional minicartridge (without a pack belt) as the tape is wound from the beginning of tape (BOT) to the end of tape (EOT), and back again. Specifically, line A represents the drive force as the tape is wound from BOT to EOT, line B represents the drive force as the tape is wound from EOT to BOT, line C represents the tape tension as the tape is moved from BOT to EOT (corresponding to line A), and line D represents the tape tension as the tape is moved from EOT to BOT (corresponding to line B). As would be expected, the graphs are roughly symmetrical, since the cartridge is roughly symmetrical. The particular shape of each pair of lines resembles a bow-tie, so these gradients in tape tension and drive force have come to be known as the "bow-tie".

Figure 11:
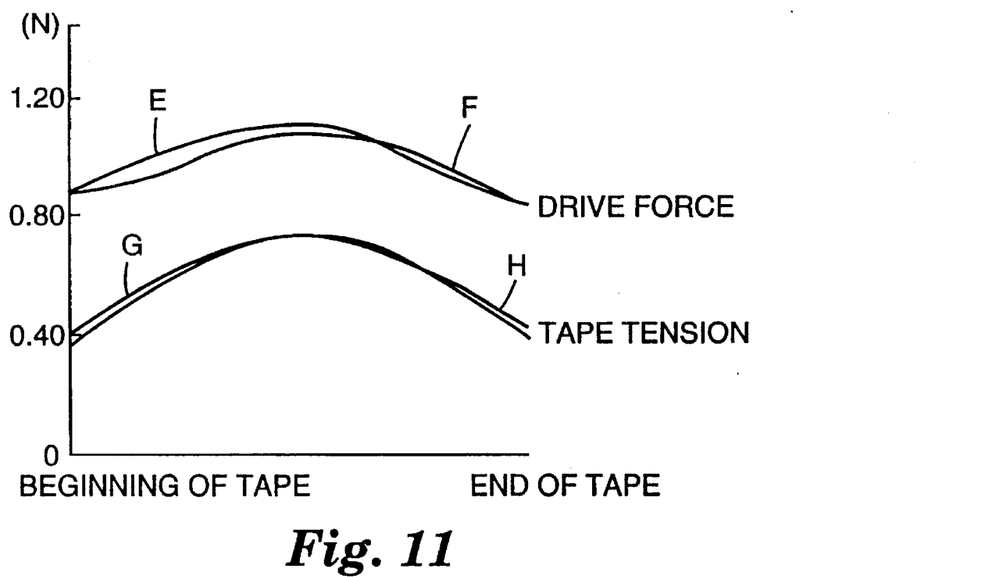
FIGS. 11–13 are graphs showing the change in drive force and tape tension during tape travel according to various examples of the first embodiment of the present invention.

In marked contrast to the conventional bow-tie shown in FIG. 10, FIG. 11 illustrates similar measurements for a minicartridge including a pack belt according to present invention. Specifically, lines E, F, G and H correspond to lines A, B, C and D, respectively. Note that the bow-tie has been virtually eliminated.

The material of the pack belt 20 can be the same as that of the drive belt 7, and of the conventional materials generally used. As will be discussed in more detail below, by appropriate adjustment of the relative tensions between the pack belt and the drive belt, the size of the bow tie can be adjusted through a wide range. Although the tension of the belts differs depending on the desired effect and the size of the cartridge in which they are being used, it generally should be in a range between 1.37 to 5.01N.

Use of the pack belt 20 reduces the fluctuation in the tensile force of the tape between the beginning and end to less than one-half of that in the conventional data cartridge. This construction will allow future data cartridges to have much higher recording densities due to stable head contacts along the entire length of the tape, as well as favorable travel performance of the tape, high durability, and low error rate.

Figure 4:
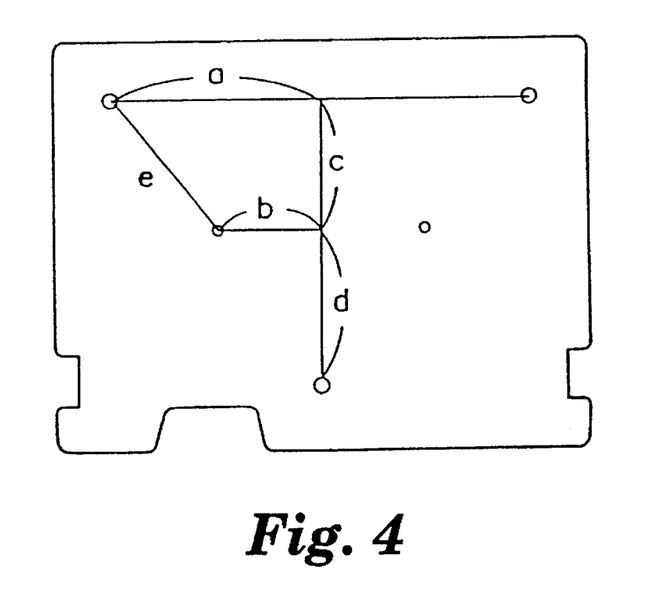
FIG. 4 is a schematic representation for explaining the position relationship between the tape hubs, the corner rollers, and the drive roller.

Preferably, the pack belt 20 begins contact with the tape 10 when approximately half of the entire length of the tape has been wound around the take-up reel. To achieve this, the necessary positioning of the hubs 2, 3, the corner rollers 4, 5 and the drive roller 6 are shown in FIG. 4. In that figure, the reference symbols (a)–(e) denote the following:

(a) ½ of the distance between the supporting shaft of the corner roller 4 and that of the corner roller 5

(b) ½ of the distance between the supporting shaft of the tape hub 2 and that of the tape hub 3

(c) the distance from the midpoint between the supporting shaft of the corner roller 4 and that of the corner roller 5 to the midpoint between the supporting shaft of the tape hub 2 and that of the tape hub 3

(d) the distance from the midpoint between the supporting shaft of the tape hub 2 and that of the tape hub 3 to the supporting shaft of the drive roller 6

(e) the distance between the supporting shaft of the corner roller 4 and the supporting shaft of the tape hub 2.

For the pack belt 20 to engage the tape on the take-up pack when approximately half of the tape has been wound on to it, the above elements should satisfy the following conditions (1) and (2):

(1) c ≦ (intermediate radius of tape pack wound on take-up hub)+(radius of corner roller)

(2) (maximum radius of tape pack wound on take-up hub) +(radius of corner roller) < e where "intermediate radius of tape pack wound on take-up hub" means the radius of the tape pack when the half of the entire length of the tape has been wound onto the take-up hub, and "maximum radius of tape pack wound on take-up hub" means the radius of the tape pack when the entire length of the tape has been wound on the take-up hub. This also assumes the various corner rollers, hubs, etc. are symmetrically positioned in the cartridge.

In a data cartridge based on the standard dimensions established by the Quarter-Inch Cartridge Inc. (QIC) industry organization standards for a 3.5 form factor cartridge (minicartridge), e.g., cartridge model DC2120 manufactured by Minnesota Mining and Manufacturing Company (3M), the values of various of the above elements are as follows: a=31.8 mm, b=15.7 mm, c=19.8 mm, d=23.1 mm, e=25.5 mm, radius of the corner roller=5.5 mm, maximum radius of tape wound around on tape hub=18.8 mm, intermediate radius of tape wound around on tape hub=14.4 mm.

In a data cartridge based on the standard dimensions established by the QIC for a 5.25 form factor cartridge (large cartridge), e.g., cartridge model DC6150 manufactured by 3M, the values of various of the above elements are as follows: a=62.7 mm, b=30.1 mm, c=34.9 mm, d=38.9 mm, e=47.8 mm, radius of the corner roller=7.9 mm, maximum radius of tape wound around on tape hub=35.4 mm, intermediate radius of tape wound around on tape hub=28.7 mm.

Preferably, the tensile force applied to the pack belt 20 to obtain the desired effects is about 1.37 to 5.01 N. If the tensile force applied to the pack belt 20 is less than about 1.37 N, the pack belt 20 may be incapable of pressing against the take-up hub strongly enough to apply a sufficient load to reduce the rotation of the take-up hub significantly. This would leave the cartridge functioning very similarly to a cartridge without a pack belt 20, i.e., the tensile force of the tape would fluctuate significantly. On the other hand, if the tensile force applied to the pack belt 20 is more than about 5.01 N, the loads applied to the corner rollers 4, 5 and the tape hubs 2, 3 become large, increasing the drive force required from the drive to move the tape 10.

More preferably, the tensile force applied to the pack belt 20 is set to be about 1.95–5.01 N (7–18 oz) and almost equal to the tensile force to be applied to the drive belt 7 (which varies depending on the size of the cartridge). For example, in a typical minicartridge manufactured by 3M, the tensile force applied to the drive belt 7 is about 7–13 ounces (about 1.95–3.62 N). In a typical large cartridge manufactured by 3 M, the tensile force applied to the drive belt 7 is about 12–18 ounces (about 3.34–5.01 N).

Preferably, the pack belt 20 is made of a flexible elastic material, similar or identical to the material of the drive belt 7. The flexible elastic material preferably contains polyurethane elastomer and trace quantities of carbon black. A polyurethane elastomer, preferably, Estane series (item numbers "58271", "58277", "58881", and "58810") manufactured by Goodrich Corp. is used. Preferably, the width of the pack belt 20 is in a range of 4 to 8 mm before it is stretched, in a range of from 2 to 5 mm after it is engaged between the corner rollers 4, 5 and less than the width of the tape 10. Preferably, the thickness of the pack belt 20 is in a range of 100 to 220 μm. The tension pre-applied to both the drive belt 7 and the pack belt 20 can be adjusted by adjusting their materials or sizes, but is most easily adjusted by changing the amount by which they are pre-stretched before installation in the data cartridge—the longer the distance they are pre-stretched, the lower the tension after installation. A method of pre-stretching the belt using thermal treatments has been described in EP 0 579 116 (Schoeppel et al.).

As described above, in the conventional tape cartridge, enough tensile force must be applied to the drive belt 7 by the rotational frictional force of the corner rollers 4, 5 to tension and move the tape 10. However, because the pressure on the corner rollers 4, 5 of the conventional tape cartridge varies with the belt tension, merely designing for a smooth rotation of the rollers is insufficient.

In contrast, in the tape cartridge according to the present invention, a constant pressure, and therefore a constant frictional force, is generated on the corner rollers 4, 5 by the pack belt 20 engaged between the corner rollers 4, 5 and the variation in pressure from the drive belt can be minimized. Therefore, the corner rollers 4, 5 can be optimized to simply rotate smoothly. Hence, a lubricant can be applied to the supporting shaft of the corner rollers 4, 5, to reduce the frictional force between the corner rollers 4, 5 and the supporting shafts thereof and prevent the corner rollers 4, 5 from abrading or seizing.

Grease is preferable as the lubricant: In controlling the tension of the tape 10 so that it does not contact the magnetic head 9 at excessively low pressure, a minimum necessary rotational frictional force or drag must be imparted to the corner rollers 4, 5. Liquid lubricant keeps the rotational frictional force of the corner rollers 4, 5 excessively low. Grease also can reliably stay between the corner rollers 4, 5 and their supporting shafts rather than flowing out.

The preferred grease in this embodiment includes: liquid base oil(s), thickening agent(s), and other additive agents, and is solid or semi-solid at the normal temperature.

As base oil, the following substances are preferable: Paraffin mineral oil and naphthene mineral oil; and synthetic oil such as dibasic acid diester, neopentyl polyol ester, phosphate, polyglycol, silicon oil, perfluoroether, polyphenylether and hydrocarbon oil.

As thickening agents, metal soap including components such as lithium, calcium, sodium, aluminum; bentonite; silica gel and polyurea.

As additive agents, oxidation stabilizer (phenyl α- naphthylamine, diphenylamine, phenotiadine and the like); extreme-pressure agent (sulfurized oil, lead naphthenic acid, Zn-dithiophosphate and the like); metal deactivator (mercaptolbenzothiazole, benzotriazole or the like); soap-structure stabilizer (monoglyceline or triglyceline, polyhydric alcohol and the like); and solid lubricant (molybdenum disulfide, graphite, fluorine-contained resin or the like).

One preferable grease is formed of a hydrocarbon base oil, a thickening agent lithium soap; and additive agents including an oxidation stabilizer, a metal deactivator, and a solid lubricant.

A preferable composition of the grease is as follows:
Base oil: 50 to 90 wt %, thickening agent: 5 to 30 wt %, and additive agents: 1 to 20 wt %. A more favorable composition of the grease is as follows: base oil: 75 to 85 wt %, thickening agent: 5 to 15 wt %,, and additive agents: 10 to 15 wt %.

Preferably, the viscosity of the lubricant is in a range of 100 poise to 5000 poise in a measurement at a shear rate 1 $sec^{-1}$. If the viscosity is less than about 100 poise, the rotation frictional force of the corner rollers 4, 5 may be reduced too much, and thus the tensile force of the tape 10 would become too low, resulting in the tape contacting with the magnetic head 9 at a very low pressure. If the viscosity is more than about 5000 poise, a high load is applied to the rotation of the corner rollers 4, 5, requiring too high a drive force. More favorably, the viscosity of the lubricant is in a range of 1000 poise to 3000 poise.

In the tape cartridge according to this embodiment, lubricant also preferably is applied between the drive roller 6 and its supporting shaft. A grease similar to that described above for the corner rollers 4, 5, but with a lower viscosity, can be used.

It also has been found that proper use of electrically conductive coatings on the drive belt 7 and pack belt 20 can significantly affect bow-tie. PCT Patent Publication No. WO 93/24928 describes certain coatings which may advantageously be applied to a drive belt. The coating includes carbon black and aluminum oxide particles dispersed in a polymeric binder. The coating is electrically conductive, minimizes wear on the roller, voltage buildup and electrical discharge within the cartridge. Normally, these coatings are on the side of the belt which contacts the corner rollers, and not on the side which contacts the tape packs.

Pack belt 20 can be coated in a similar manner to the drive belt 7. If so, it has been found that the best combination is to have the coated side of the drive belt contact the uncoated side of the pack belt, rather than having both coated sides of the belts contact each other. That is, as shown in FIG. 5, coated side 20a of the pack belt 20 contact the corner rollers 4, 5, the coated side 7a of the drive belt 7 contact the uncoated side 20b of the pack belt 20, and the uncoated side of the drive belt 7b contact the tape packs. Such a construction dramatically reduces the bow-tie compared to having the pack belt the other way around.

The amount of restraint provided by the pack belt depends on the frictional engagement with the pack belt. Preferably, in selecting the belt materials and the coating, materials should be selected such that the friction coefficient between the coated side of the drive belt and the uncoated side of the pack belt is about 0.1 to 0.4, more preferably about 0.1 to 0.3, and most preferably about 0.15 to 0.25.

The ability to minimize bow-tie can be used to increase the amount of tape inside a cartridge by allowing for a reduction in the size of the hubs 2, 3. As described above, in the conventional tape cartridge, tensile force generated on the tape 10 fluctuates due to changes in the diameters of the tape packs wound around the hubs. This means that the total size of the bow-tie is controlled in part by the relationship between size of the outer diameter (r) of the tape hub with no tape wound on it and the maximum diameter (R) of the tape hub with the tape wound on it. Given past bow-tie problems, the minimum diameter r has been kept fairly large, to keep the bow-tie from becoming too large. The ability of the present invention to minimize bow-tie allows a modification of the hub diameter r to a much smaller value. This in turn provides more space inside the cartridge for tape, which increases the capacity of the cartridge.

For example, in this embodiment, the relationship between the outer diameters r of the tape hubs and the maximum diameters R of the tape hubs can be set as R/r≧2.6 and, even more favorably, R/r≧4.0. More specifically, in a large cartridge, the outer diameters r of the tape hubs could be altered from the 28.3 mm conventionally used to a range of 13 to 17 mm and the maximum diameters R of the tape pack set to a range of 70 to 76 mm (R/r=4.12–5.85). This would allow the cartridge to accommodate 450–500 m of tape, compared to the 310.9 m maximum conventionally used.

Figure 6:
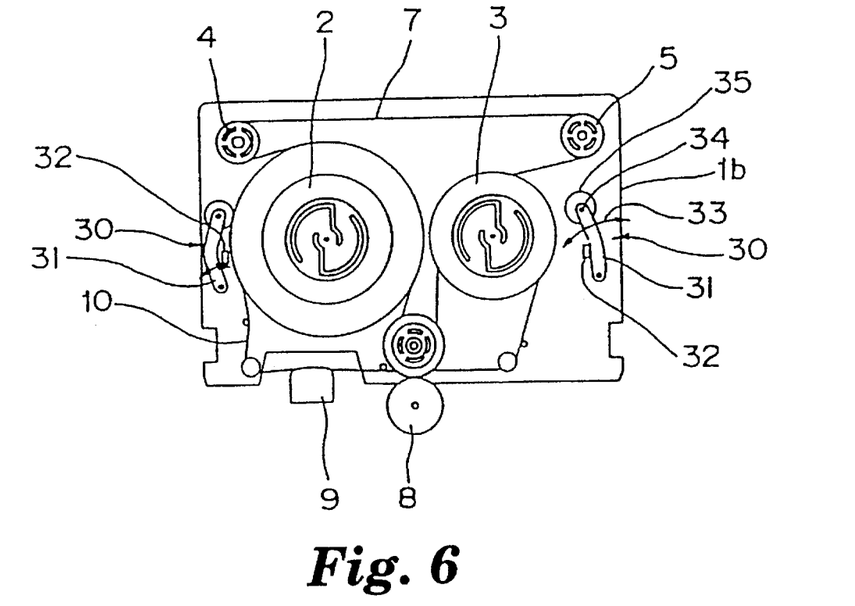
FIG. 6 is a plan view of a second embodiment of the present invention.

FIG. 6 shows the construction of a tape cartridge according to a second embodiment of the present invention. In the second embodiment, pressing arms 30 are used instead of pack belt 20 to apply an appropriate load to the rotation of the tape hubs 2, 3. Each pressing arm 30 has a V-shaped arm 31 and a stopper 32 in the vicinity of the tape hubs 2, 3. The arm 31 is pivotally mounted to the baseplate 1b to rotate in the direction shown by an arrow 33. A torsion spring (not shown) is provided at the other end of the arm 31 to urge the arm 31 to press toward the tape 10 wound around the hubs 2, 3. Stopper 32 also is mounted to the baseplate 1b to prevent unnecessary rotation of the arm 31 when less than half of the tape 10 is wound around the take-up hub. A roller 35 is rotatably mounted on a rotational axis 34 on one end of the arm 31 to reduce friction between the arm 31 and the tape 10 when the arm 31 is brought into contact with the tape 10.

The arm 31 and stopper 32 are not limited to the positions shown in FIG. 6, but may be mounted in any area in the cartridge in which they do not interfere with proper movement of the tape 10 and drive belt 7.

As will be apparent, with this design the arm 31 will start to press the tape 10 after approximately half of the entire length of the tape 10 is wound around the take-up hub 3, and as a result, a load starts to be applied to the rotation of the take-up hub 3. Accordingly, the construction also can reduce the fluctuation in the tape tensile force.

Lubricants of the type described above with respect to the first embodiment can also be used with the corner rollers 4, 5 and drive roller 6 of the second embodiment.

Figure 7:
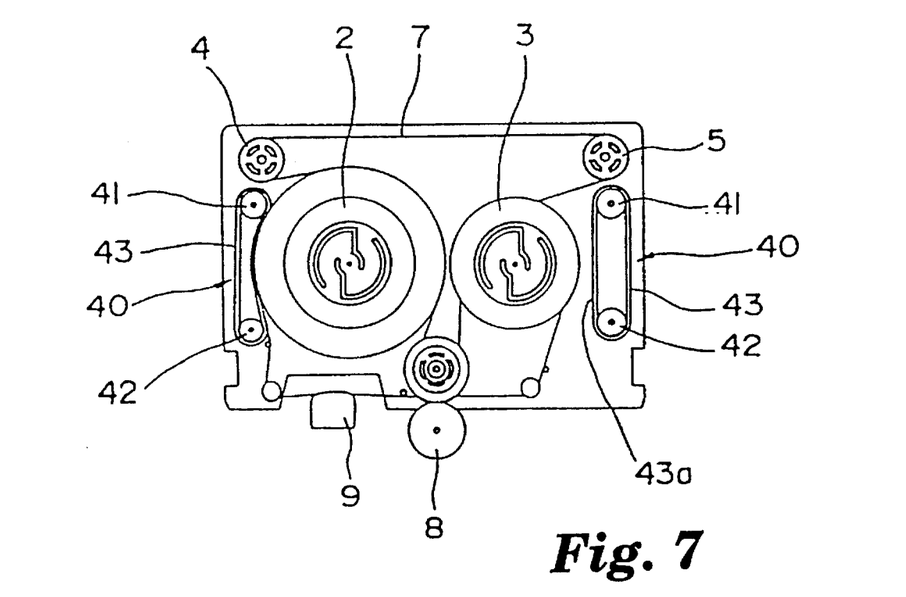
FIG. 7 is a plan view of a third embodiment of the present invention.

FIG. 7 shows the construction of a tape cartridge according to a third embodiment of the present invention. In the third embodiment, two pack belts 40 are provided instead of one. Each pack belt 40 includes a pair of rollers 41, 42 which are rotatable on supporting shafts and a belt 43 engaged between the rollers 41, 42. The rollers 41, 42 are placed in a position in which the inner surface 43a of the belt 43 is brought into contact with the tape 10 and presses it after approximately half of the tape 10 is wound around the take-up hub (for example, tape hub 2). As shown in the drawing, the rollers 41, 42 also are located at a position in which the tape 10 will not contact the rollers 41 and 42 when the entire tape 10 has been wound around a hub.

As with the second embodiment, the positions of the rollers 41, 42 and belts 43 are not limited to the positions shown in FIG. 7, but may be installed anywhere in the cartridge that they will perform their function and not inappropriately interfere with movement of the tape 10 and drive belt 7.

The material and tensile force of the belt 43 may be much the same as those of the pack belt 20. Again, lubricants of the type described above with respect to the first embodiment can also be used with the corner rollers 4, 5 and drive roller 6 of the third embodiment.

In operation, as with the first embodiment, the belt 43 will start to press the tape 10 after approximately half of the entire length of the tape 10 is wound around the hub closest to the belt 43, thereby applying a load to the hub.

Figure 8:
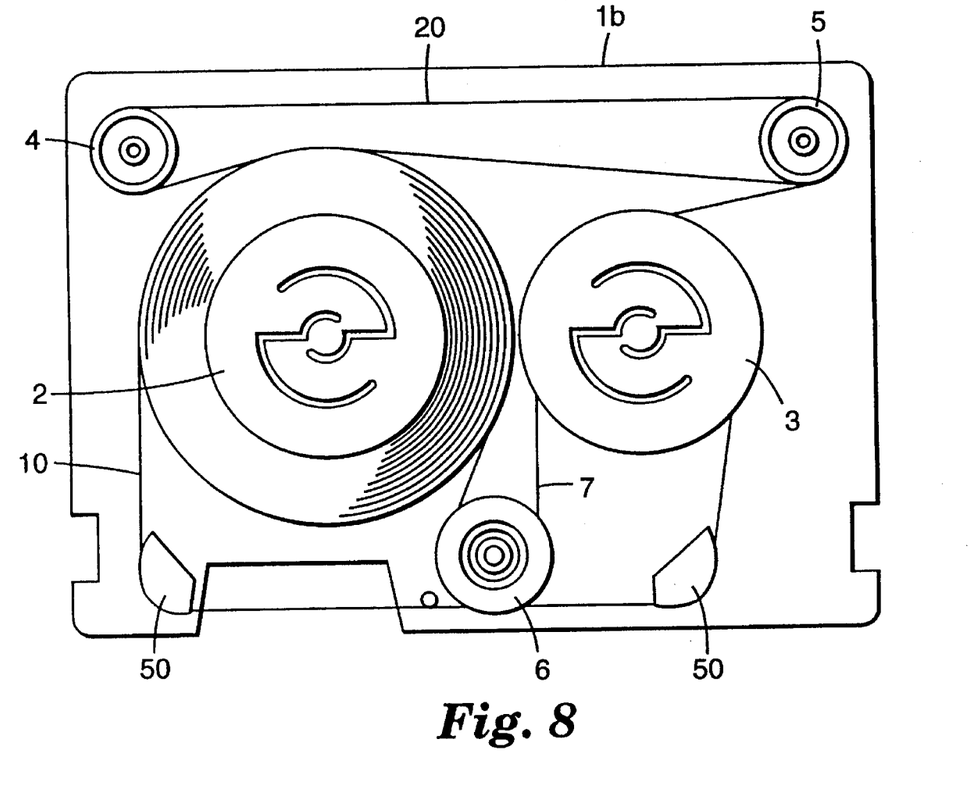
FIG. 8 is a plan view of a fourth embodiment of the present invention.
Figure 9:
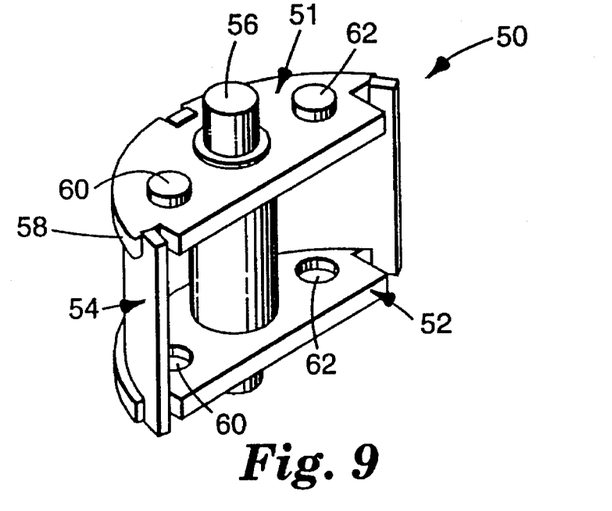
FIG. 9 is a perspective view of one of the self-acting hydrodynamically lubricated guides of FIG. 8.

According to a fourth embodiment of the invention shown in FIG. 8, most of the components of the cartridge remain the same as in the first embodiment, but self-acting hydrodynamically lubricated guides 50 (shl guides) of the type taught by U.S. Pat. No. 5,358,193 (Madsen et al.) are substituted for the guides 11 and wrap pins 12. Details of an shl guide 50 are shown in FIG. 9, in which the guide 50 includes top and bottom flange pieces 51, 52 separated by a tape surface piece 54 and a post 56. Each flange piece 51, 52 is generally semi-circular and can have a constant radius curved side. In the illustrated embodiment, the curved side 58 has a varying radius. The post 56 and two half-shears or buttons 60, 62 then are used to mount the shl guide 50 in the cartridge housing 1 without rotation. Shl guides are described in great detail in the foregoing patent, and therefore will not be described further herein.

In use, the shape of an shl guide entraps air between the tape and the tape surface piece 54, thereby providing hydrodynamic lubrication. This effect depends on a combination of tape tension, tape speed, tape guide geometry and surface roughness. When heretofore used in a data cartridge such as that shown in U.S. Pat. No. 5,358,193 (Madsen et al.), the guides have proven to provide good lubrication at high tape travel speeds, but not always at low tape travel speeds, due to the tape tension bow-tie. In contrast, in the current fourth embodiment including a pack belt, good lubrication can be achieved even at lower tape travel speeds, due to reduction of the tape tension bow-tie. The result is that the maximum force necessary to drive the tape can be lowered substantially, while maintaining adequate tension in the tape to ensure proper contact with the magnetic head. Tape movement also is much more controllable at a greater range of tape speeds, allowing for higher density of data storage per unit area of tape.

The invention will be described further by reference to the following specific examples:

EXAMPLE 1

A model DC2120 minicartridge manufactured by 3M was adjusted and modified as follows to produce an example of the first embodiment:

A pack belt was added around the two corner rollers 4, 5, with the tensile force applied to the pack belt 20 set to 2.50 N. The viscosity of lubricant applied to the corner rollers 4, 5 was 4490 poise (shear rate 1 $sec^{-1}$); hydrocarbon oil was used as base oil; and grease containing lithium soap was used as a thickening agent. The consistency of the grease was 300 to 330; and the dropping point was 202° C.

The outer diameters of the tape hubs 2, 3 were 15.1 mm, and the maximum diameter (R) of the tape packs was 38.0 mm. Thus, R/r was 2.52. The length of the tape 10 accommodated in the data cartridge was 94 m, and the thickness of the tape 10 is 9.6 μm.

In the data cartridge having this construction, the fluctuation of the tensile force of the tape and change in the drive force was measured while the tape traveled from beginning of tape (BOT) to end of tape (EOT) and then back again. This measurement was done using a conventional minicartridge drive with a mechanical sensor substituted for the magnetic head to allow measurement of the fluctuation in tape tension, and with a mechanical sensor mounted on the drive puck to allow measurement of the drive force. Measurements were taken at a tape travel speed of 90 inches/ second (about 2.29 m/s), with bow-tie defined as the measurement at BOT minus the measurement at EOT for tape travel in the forward direction, and the measurement at EOT minus the measurement at BOT for tape travel in the reverse direction.

Measurements were taken in the same fashion as in Example 1. Measured results are shown in Table 1 shown below. No significant noise was generated due to eccentricity of the rollers.

TABLE 1

Maximum fluctuation in tape tension and maximum drive force ("bow-tie") of Examples 1–4

| Example | Pack belt tension (N) | Lubricant viscosity (poise) | Max. tape tension fluctuation (N) | | Max. drive force fluctuation (N) | |
|---|---|---|---|---|---|---|
| | | | BOT to EOT | EOT to BOT | BOT to EOT | EOT to BOT |
| 1 | 2.50 | 4490 | 0.38 | 0.39 | 1.11 | 1.03 |
| 2 | 2.50 | 2333 | 0.26 | 0.26 | 0.60 | 0.58 |
| 3 | 1.95 | 4490 | 0.44 | 0.44 | 0.96 | 0.98 |
| 4 | 3.56 | 2333 | 0.31 | 0.25 | 0.79 | 0.66 |
| Comp. 1 | — | 4490 | 0.52 | 0.53 | 1.20 | 1.15 |

The measured results are shown in Table 1 shown below. No significant noise was generated due to eccentricity of the rollers.

As can be seen, the pack belt significantly reduces the bow-tie, and adjustment of the grease reduces it even further.

EXAMPLE 2

The construction of the tape cartridge of Example 2 was the same as that of Example 1, except for the grease used as a lubricant. The viscosity of the lubricant applied to the corner rollers 4, 5 was 2333 poise (shear rate 1 sec$^{-1}$) and was a grease using a hydrocarbon oil as base oil and a lithium soap as a thickening agent. The consistency of the grease was 285; and dropping point was 196° C.

Measurements were taken in the same fashion as in Example 1. Measured results are shown in Table 1 shown below. No significant noise was generated due to eccentricity of the rollers.

EXAMPLE 3

The construction of the tape cartridge of Example 3 was the same as that of Example 1, except that the tension of the pack belt 20 was changed from 2.50 N to 1.95 N.

Measured results are shown in Table 1 shown below. No significant noise was generated due to eccentricity of the rollers.

EXAMPLE 4

The construction of the tape cartridge of Example 4 was the same as that of Example 1, except that the tension of the pack belt 20 was changed from 2.50 N to 3.56 N, and the grease used as a lubricant applied to the corner rollers 4, 5 was changed to the same one as that used in Example 2.

Measurements were taken in the same fashion as in Example 1. Measured results are shown in Table 1 shown below. No significant noise was generated due to eccentricity of the rollers.

Comparison Data Cartridge 1

Tests were run on a comparison data cartridge to compare it with those of Example 1 through Example 4. The comparison data cartridge had the same specification as that of Example 1 except that the pack belt 20 was not mounted in it.

EXAMPLE 5

A model DC6525 large cartridge manufactured by 3M was adjusted and modified as follows to produce an example of the first embodiment:

A pack belt was added around the two corner rollers 4, 5, with the tensile force applied to the pack belt 20 set to 4.17 N. The lubricant applied to the corner rollers 4 and 5 is the same as that used in Example 1.

The outer diameters of the tape hubs 2, 3 were 15.1 mm, and the maximum diameter (R) of the tape packs was 75.5 mm. Thus, R/r was 5.00. The length of the tape 10 accommodated in the data cartridge was 482 m, and the thickness of the tape 10 was 9.6 μm.

Measurements were taken in the same fashion as in Example 1, in a large cartridge drive modified in the same manner as the minicartridge drive described in Example 1. Measured results are described below:

The maximum fluctuation in the tension of the tape during travel is 0.33 N, in both the forward and reverse directions. This value is approximately 33% less than the maximum value 0.50 N the fluctuation in the tension of the tape measured in a conventional data cartridge which accommodated a tape of 482 m and which was not provided with the pack belt 20. In the data cartridge of Example 5, the maximum drive force is 1.16 N which is almost equal to that (1.13 N) of the conventional one which accommodated the tape of 482 m and is not provided with the pack belt 20. No significant noise was generated due to eccentricity of the rollers.

EXAMPLE 6

As explained above, it has also been discovered that a high degree of control of the tape tension is available through judicious control of the relative tension in the pack belt 20 and drive belt 7. To provide an example, a model DC2120 minicartridge manufactured by 3M was adjusted and modified by adding a pack belt 20 around the corner rollers 4, 5 thereof. The tension of the drive belt was set at about 5 oz (about 1.36 N) and the tension of the pack belt was set at about 3 oz (about 0.84 N).

Measurements were taken in the same fashion as in Example 1. Measured results are shown in Table 2 shown below. The results also are graphed in FIG. 12, in which line I represents the drive force in the BOT to EOT direction, line J represents the drive force in the EOT to BOT direction, line K represents the tape tension in the BOT to EOT direction, and line L represents the tape tension in the EOT to BOT direction.

Figure 12:
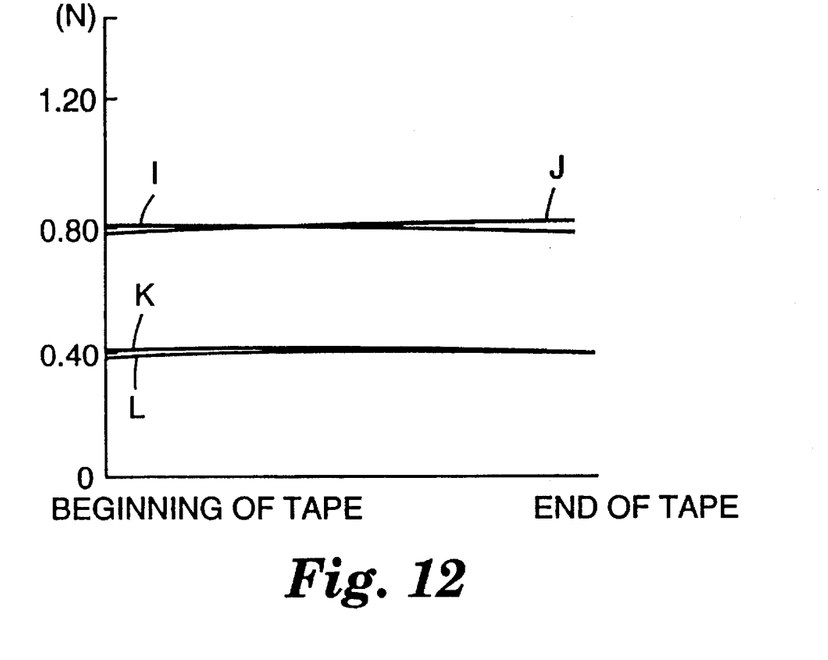

As is apparent from the measurements, in this construction bow-tie has been virtually eliminated.

EXAMPLE 7

The construction of the tape cartridge of Example 7 was the same as that of Example 6, except that the tension of the drive belt was set at about 5.0 oz (about 1.36 N) and the tension of the pack belt was set at about 5.4 oz (about 1.50 N).

Measurements were taken in the same fashion as in Example 1. Measured results are shown in Table 2 shown below. The results also are graphed in FIG. 13, in which line M represents the drive force in the BOT to EOT direction, line N represents the drive force in the EOT to BOT direction, line O represents the tape tension in the BOT to EOT direction, and line P represents the tape tension in the EOT to BOT direction.

Figure 13:
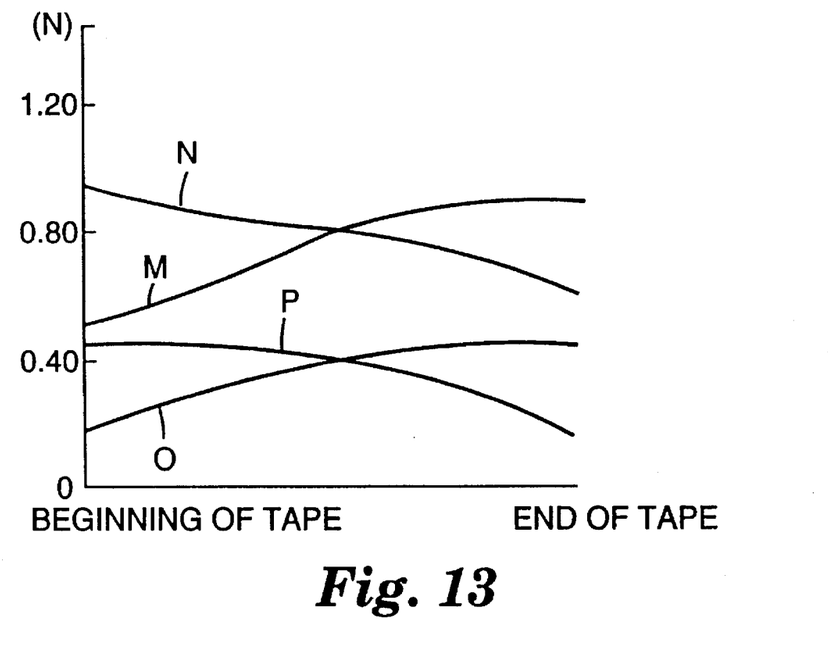

In this construction the bow-tie has been flipped upside down, i.e., a negative bow-tie has been created.

COMPARISOM DATA CARTRIDGE 2

Tests were run on a comparison data cartridge to compare it with those of Examples 6 and 7. The comparison data cartridge had the same specification as that of Example 6 except that the pack belt was not mounted in it and the drive belt tension was set at about 9.8 oz (about 2.72 N).

Measurements were taken in the same fashion as in Example 1. Measured results are shown in Table 2 shown below.

TABLE 2

| | Maximum fluctuation in tape tension and maximum drive force ("bow-tie") of Examples 6 and 7 | | | | | |
|---|---|---|---|---|---|---|
| | Pack belt tension | Drive belt tension | Max. tape tension fluctuation (N) | | Max. drive force fluctuation (N) | |
| Example | (N) | (N) | BOT to EOT | EOT to BOT | BOT to EOT | EOT to BOT |
| 6 | 0.84 | 1.39 | 0.10 | 0.11 | 0.07 | 0.04 |
| 7 | 1.50 | 1.39 | −0.30 | −0.30 | −0.30 | −0.22 |
| Comp. 2 | — | 2.72 | 0.29 | 0.30 | 0.19 | 0.22 |

EXAMPLE 8

As described above, it has also been found that controlling the frictional coupling between the pack belt and drive belt can further help control the bow-tie. For this example, a cartridge was prepared using a pack belt and a drive belt both of which had one side coated with a coating of the type taught by WO 93/24928. According to the teachings of that reference, the coated side of the drive belt faces the corner rollers, while the uncoated side faces the tape pack. To test what difference it made whether the coated side of the pack belt faced the corner rollers or the drive belt, the pack belt was inserted with its coated side facing the drive belt, and its uncoated side facing the corner rollers. Tests such as those in Example 1 then were run to test the tape tension bow-tie five times and averaged. The pack belt was then flipped so that the uncoated polyurethane side of the pack belt faced the drive belt, and the coated side faced the corner rollers. Test were again run five times and averaged. The pack belt was then flipped twice more and tested each time, to produce two sets of average measurements for the pack belt with its coated side facing the drive belt, and two sets with its uncoated side facing the pack belt. At all times, the total tension in the drive belt and pack belt was kept at about 8 oz (about 2.22 N). The results of the measurement are shown in Table 3. As is apparent from the measurement, bow-tie is reduced substantially by having the uncoated side of the pack belt face the drive belt.

COMPARATIVE EXAMPLE 3

The same cartridge as in example 8 was tested without a pack belt. The drive belt tension was kept at about 8 oz (about 2.22 N). Tests such as those in Example 1 were run to test the tape tension bow-tie five times and averaged. The results of the measurement are shown in Table 3.

TABLE 3

| Average fluctuation in tape tension ("bow-tie") of Example 8 | | |
|---|---|---|
| Side of drive belt facing pack belt | Side of pack belt facing drive belt | Average Tape Tension Bow-tie (N) |
| Coated | Coated | 0.056 |
| Coated | Uncoated | 0.008 |
| Coated | Coated | 0.064 |
| Coated | Uncoated | 0.017 |
| Comp. 3 | | 0.267 |

EXAMPLE 9

Having narrowed the bow-tie, it is now possible to lower the total drive force required, improving the efficiency of the drive/cartridge system. In particular the pack belt can be combined with self-acting hydrodynamically lubricated guides (shl guides) of the type taught by U.S. Pat. No. 5,358,193 (Madsen et al.). For this example, a DC2120 was modified by substituting compound radius shl guides for the prior tape guides. Each shl guide had radii of 0.35", 0.25"and 0.35"(about 8.9 mm, 6.4 mm and 8.9 mm, respectively). The large radius at the entrance of the shl guide in either direction entraps air between the guide and the tape, which then is carried over the small radius, reducing the tape-backside-to-tape-guide friction.

The cartridge as modified was then tested in a fashion similar to that described in Example 1, but at five different tape travel speeds of 30, 60, 90, 120 and 150 inches per second (about 0.76, 1.52, 2.29, 3.05 and 3.81 m/s, respectively). The average minimum tape tension and the average maximum drive force so measured are shown in Tables 4 and 5, respectively. From the results, the efficiency of the overall cartridge/drive system was calculated, with "efficiency" being defined as the average minimum tape tension divided by the average maximum drive force. The resulting efficiencies are shown in Table 6.

EXAMPLE 10

A DC2120 minicartridge manufactured by 3M was modified by adding a pack belt. The modified cartridge was then tested and efficiency was calculated in the same fashion as in Example 9. The resulting averages and efficiencies are shown in Tables 4–6.

EXAMPLE 11

A DC2120 minicartridge manufactured by 3M was modified by adding a pack belt and substituting shl guides of the same design as in Example 9 for the prior tape guides. The modified cartridge was then tested and efficiency was calculated in the same fashion as in Example 9. The resulting averages and efficiencies are shown in Tables 4–6.

COMPARATIVE EXAMPLE 4

A DC2120 minicartridge manufactured by 3M was tested and efficiency was calculated in the same fashion as in Example 9. The resulting averages and efficiencies are shown in Tables 4–6.

TABLE 4

| | | | | |
|---|---|---|---|---|
| Average minimum tape tension of Examples 9–11 | | | | |
| Tape speed (m/s) | Example 9 (N) | Example 10 (N) | Example 11 (N) | Comp. 4 (N) |
| 0.76 | 0.30 | 0.26 | 0.26 | 0.26 |
| 1.52 | 0.34 | 0.30 | 0.28 | 0.32 |
| 2.29 | 0.35 | 0.30 | 0.27 | 0.36 |
| 3.05 | 0.35 | 0.27 | 0.28 | 0.37 |
| 3.81 | 0.36 | 0.24 | 0.27 | 0.40 |

TABLE 5

| | | | | |
|---|---|---|---|---|
| Average maximum drive force of Examples 9–11 | | | | |
| Tape speed (m/s) | Example 9 (N) | Example 10 (N) | Example 11 (N) | Comp. 4 (N) |
| 0.76 | 0.78 | 0.64 | 0.53 | 0.81 |
| 1.52 | 0.73 | 0.74 | 0.54 | 0.91 |
| 2.29 | 0.68 | 0.77 | 0.55 | 0.96 |
| 3.05 | 0.65 | 0.79 | 0.53 | 0.97 |
| 3.81 | 0.64 | 0.77 | 0.54 | 0.95 |

TABLE 6

| | | | | |
|---|---|---|---|---|
| Average minimum tape tension divided by average maximum drive force of Examples 9–11 | | | | |
| Tape speed (m/s) | Example 9 (%) | Example 10 (%) | Example 11 (%) | Comp. 4 (%) |
| 0.76 | 38.9 | 40.6 | 49.5 | 32.6 |
| 1.52 | 46.2 | 40.4 | 51.3 | 35.5 |
| 2.29 | 51.6 | 38.7 | 49.2 | 37.2 |
| 3.05 | 53.2 | 34.6 | 51.8 | 38.2 |
| 3.81 | 57.0 | 31.3 | 49.2 | 41.4 |

As can be seen, Example 11, which includes both a pack belt and shl guides, is comparable in efficiency to any of the other embodiments at high tape speeds, and considerably better than any other embodiment at low tape speeds. Since a tape typically is read from or written to at low tape speed, and only fast forwarded or reversed at high speeds, this provides a significant enhancement in the overall efficiency of the cartridge/drive system, which should allow for a significantly lower overall power consumption for the system. Also, this provides greater control and accuracy at lower speeds, again allowing for increased density in data storage on the tape.

The invention has been described with respect to particular embodiments, but the scope of the invention is not limited thereto. It will be clear to one of skill in the art that the concepts disclosed above could be combined in various ways, both among the embodiments shown, and with other concepts. Accordingly, the invention is limited only by the scope of the following claims.

We claim:

1. In a belt driven tape cartridge having a base; a supply side tape hub and a winding side tape hub both rotatably mounted on the base; tape wound around the hubs to form a tape pack about each hub and extending along a tape path disposed along a side of the base, the tape wound around the supply side tape hub being fed to the winding side tape hub along the path to be wound around the winding side tape hub; a drive roller rotatably mounted on the base and disposed close to the tape path and between the supply side tape hub and the winding side tape hub; a first corner roller rotatably mounted on the base at a position opposed to the drive roller with respect to the supply side tape hub; a second corner roller rotatably mounted on the base at a position opposed to the drive roller with respect to the winding side tape hub; a drive belt engaged on the drive roller, the tape pack on the supply side tape hub, the first corner roller, the second corner roller, and the tape pack on the winding side tape hub such that the drive belt passes on the surface of the supply side tape pack and the surface of the winding side tape pack opposed to each other, characterized in that a restraining mechanism is located adjacent to the winding side tape hub pack and starts to press against the tape pack wound around the winding side tape hub after approximately half of the tape is wound around the winding side tape hub, thus restraining rotation of the winding side tape hub.

2. The belt-driven tape cartridge of claim 1, wherein the corner rollers are mounted to the base by a rotational shaft, and a lubricant having a viscosity between about 100 and 5,000 poise when the viscosity is measured at a shear rate of 1 sec$^{-1}$ is applied between the rotational shafts and the rollers.

3. The belt-driven tape cartridge of claim 1, wherein the restraining mechanism comprises a pressing belt engaged on the first and second corner rollers, disposed on an inner side of the drive belt, and moving together with the drive belt.

4. The belt-driven tape cartridge of claim 3, wherein the tension pre-applied to the pressing belt is between about 1.38 and 5.01N.

5. The belt-driven tape cartridge of claim 3, wherein the tension pre-applied to the pressing belt is between about 0.49 and 5.01N.

6. The belt-driven tape cartridge of claim 1, wherein the relationship between the outer diameter (r) of the supply side tape hub with no tape wound therearound and the maximum outer diameter (R) with the tape wound around and layered on the supply side tape hub is $R/r \geq 2.6$.

7. A belt-driven tape cartridge comprising:

a) a housing having a media access opening and a drive opening formed therein;

b) first and second tape hubs rotatably mounted within the housing;

c) tape wound about the first and second hubs to form first and second tape packs thereabout and extending therebetween along a tape path which passes across the media access opening;

d) a drive roller rotatably mounted in the housing and accessible from outside the housing through the drive opening;

e) first and second corner rollers rotatably mounted in the housing on opposite sides of the first and second hubs, respectively, from the drive roller;

f) an elastic elastic belt stretched about the drive roller, the first and second tape packs and the first and second corner rollers such that movement of the drive roller will drive; movement of the tape; and g) a pressing mechanism for selectively starting to press against one or the other of the tape packs to add load to the rotation of that tape pack after approximately half of the tape is wound around the selected tape hub.

8. The tape cartridge of claim 7, wherein the pressing mechanism comprises:

a) a first and a second pressing arm, the arms being pivotally mounted in the housing adjacent to the first and second tape packs, respectively, and being biased toward the tape packs and selectively pressing against the tape packs; and b) first and second stoppers in the housing for preventing the pressing arms from moving more than a predetermined distance toward the tape hubs.

9. The tape cartridge of claim 8, wherein the stoppers are positioned to prevent the first and second pressing arms from moving closer to the first and second hubs, respectively, than the outer diameter of the first and second tape packs when about one-half of the tape is wound on each tape pack.

10. The tape cartridge of claim 8, wherein the pressing mechanism further comprises rollers mounted at the ends of the pressing arms for pressing against the tape packs.

11. The tape cartridge of claim 7 wherein the pressing mechanism comprises:

a) first and second pairs of rollers mounted adjacent the sides of the first and second tape packs; and b) first and second elastic belts stretched about the first and second pairs of rollers, respectively, to press against the first and second tape packs, respectively, when their diameter is above a predetermined diameter.

12. The tape cartridge of claim 11, wherein the predetermined diameter is the diameter of the tape packs when about one-half of the tape is wound on each tape pack.

13. The tape cartridge of claim 7, wherein the pressing mechanism comprises an elastic pack belt stretched about the corner rollers.

14. The cartridge of claim 13, wherein the pack belt is positioned on the corner rollers and the drive belt.

15. The tape cartridge of any of claims 13, wherein one side each of the pack belt and the drive belt are coated with an electrically conductive coating, the coated side of the pack belt faces the corner rollers and the coated side of the drive belt faces the uncoated side of the pack belt.

16. The tape cartridge of claim 13, wherein the tension in the pack belt is pre-applied to be about 30–110% of the tension in the drive belt.

17. The tape cartridge of claim 16, wherein the tension in the pack belt is pre-applied to be about 40–80% of the tension in the drive belt.

18. The tape cartridge of claim 17, wherein the tension in the pack belt is pre-applied to be about 55–65% of the tension in the drive belt.

19. The tape cartridge of any of claims 13, wherein one side each of the pack belt and the drive belt are coated with a coating, the coated side of the pack belt faces the corner rollers and the coated side of the drive belt faces the uncoated side of the pack belt, and wherein the materials of the pack belt and the coating on the drive belt are selected such that the coefficient of friction between them is about 0.1 to 0.4.

20. The tape cartridge of claim 19, wherein the curved radius side has a compound radius.

21. The tape cartridge of claim 19, wherein the materials of the pack belt and the coating on the drive belt are selected such that the coefficient of friction between them is about 0.1 to 0.3.

22. The tape cartridge of claim 19, wherein the materials of the pack belt and the coating on the drive belt are selected such that the coefficient of friction between them is about 0.15 to 0.25.

23. The tape cartridge of any of claims 7, wherein the tape is guided along at least part of the tape path by self-acting hydrodynamically lubricated guides.

24. The tape cartridge of claim 23, wherein the self-acting hydrodynamically lubricated guides are positioned to guide the tape across the media access opening.

25. The tape cartridge of claim 23, wherein each self-acting hydrodynamically lubricated guide comprises:

a) a top plate having a curved radius side;

b) a bottom plate having a curved radius side matching the shape of the curved radius side of the top plate;

c) a tape surface piece mounted along the curved radius side of the top and bottom plates, the curved radius being such as to entrap air between the tape surface piece and the tape when tape is moved past the self-acting guide.

* * * * *

UNITED STATES PATENT AND TRADEMARK OFFICE
CERTIFICATE OF CORRECTION

PATENT NO.: 5,577,681

DATED: November 26, 1996

INVENTOR(S): Sano et al.

It is certified that error appears in the above-identified patent and that said Letters Patent is hereby corrected as shown below:

Col. 13, line 30, "COMPARISOM" should be --COMPARISON--.

Col. 17, line 16, "an elastic elastic belt" should be --an elastic drive belt--.

Signed and Sealed this

Fifteenth Day of July, 1997

*Attest:*

BRUCE LEHMAN

*Attesting Officer*         Commissioner of Patents and Trademarks